United States Patent
Bartos et al.

(10) Patent No.: US 10,857,490 B2
(45) Date of Patent: Dec. 8, 2020

(54) SEPARATION PROCESS HAVING IMPROVED CAPACITY

(71) Applicant: BP Corporation North American Inc., Naperville, IL (US)

(72) Inventors: Thomas Bartos, Arden, NC (US); Anders Bitsch-Larsen, Wheaton, IL (US); Timothy Keyes, Arden, NC (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 15/322,348

(22) PCT Filed: Aug. 10, 2015

(86) PCT No.: PCT/US2015/044492
§ 371 (c)(1),
(2) Date: Dec. 27, 2016

(87) PCT Pub. No.: WO2016/025399
PCT Pub. Date: Feb. 18, 2016

(65) Prior Publication Data
US 2018/0207559 A1    Jul. 26, 2018

Related U.S. Application Data

(60) Provisional application No. 62/035,652, filed on Aug. 11, 2014.

(51) Int. Cl.
*B01D 33/09* (2006.01)
*B01D 33/60* (2006.01)
*B01D 33/66* (2006.01)

(52) U.S. Cl.
CPC ............ *B01D 33/09* (2013.01); *B01D 33/60* (2013.01); *B01D 33/663* (2013.01); *B01D 2201/202* (2013.01); *B01D 2201/345* (2013.01)

(58) Field of Classification Search
None
See application file for complete search history.

(56) References Cited

U.S. PATENT DOCUMENTS

| | | | | | |
|---|---|---|---|---|---|
| 2,352,304 | A | * | 6/1944 | Young | D06B 23/20 210/391 |
| 2,741,369 | A | * | 4/1956 | Fest | B01D 33/09 210/217 |
| 2,839,194 | A | * | 6/1958 | Lopker | C01B 25/22 210/193 |
| 2,963,158 | A | * | 12/1960 | Jung | B01D 35/20 210/86 |
| 3,363,774 | A | * | 1/1968 | Oscar | B01D 33/09 210/404 |

(Continued)

FOREIGN PATENT DOCUMENTS

| CN | 87102662 | 1/1988 |
|---|---|---|
| CN | 203183795 | 9/2013 |

(Continued)

*Primary Examiner* — Robert J Popovics
(74) *Attorney, Agent, or Firm* — McDonnell Boehnen Hulbert & Berghoff LLP

(57) ABSTRACT

A process for the separation of the components of a solid/liquid mixture. The process Includes the use of a rotary pressure filter apparatus having improved capacity.

20 Claims, 4 Drawing Sheets

(56) References Cited

U.S. PATENT DOCUMENTS

| | | | | |
|---|---|---|---|---|
| 3,587,863 | A * | 6/1971 | Kristofl | B01D 33/073 210/404 |
| 3,630,380 | A * | 12/1971 | Barnebl | B01D 37/02 210/404 |
| 3,950,409 | A * | 4/1976 | Yokota | C07C 51/265 562/414 |
| 4,276,169 | A * | 6/1981 | Browne | B01D 33/09 210/404 |
| 4,292,123 | A * | 9/1981 | Lintunen | B01D 33/466 162/60 |
| 4,383,877 | A * | 5/1983 | LaValley | B01D 33/82 156/155 |
| 4,419,165 | A * | 12/1983 | LaValley | B01D 33/067 156/155 |
| 4,581,139 | A * | 4/1986 | Kosonen | B01D 33/067 210/232 |
| 4,816,169 | A * | 3/1989 | LaValley | B01D 33/073 210/784 |
| 5,046,338 | A * | 9/1991 | Luthi | D21C 9/06 68/158 |
| 5,362,393 | A | 11/1994 | Kuhme | |
| 5,470,473 | A * | 11/1995 | Park | B01D 33/073 210/402 |
| 5,589,079 | A * | 12/1996 | Park | B01D 33/073 210/391 |
| 5,643,468 | A * | 7/1997 | Ure | B01D 33/04 210/771 |
| 5,676,847 | A * | 10/1997 | Yamamoto | B01D 33/073 210/784 |
| 5,722,264 | A * | 3/1998 | Antkowiak | B01D 33/09 68/43 |
| 5,842,242 | A * | 12/1998 | Antkowiak | B01D 33/09 8/156 |
| 5,914,048 | A * | 6/1999 | Chase | B01D 33/21 137/487.5 |
| 6,500,347 | B2 * | 12/2002 | Ohkoshi | B01D 33/09 210/772 |
| 7,282,151 | B2 * | 10/2007 | Parker | B01D 33/073 210/634 |
| 7,402,694 | B2 * | 7/2008 | Lin | C07C 51/42 562/414 |
| 7,462,736 | B2 * | 12/2008 | Parker | C07C 51/265 562/485 |
| 7,569,722 | B2 * | 8/2009 | Lin | C07C 51/42 203/15 |
| 7,807,060 | B2 * | 10/2010 | Schmid | B01D 33/04 210/391 |
| 7,888,530 | B2 * | 2/2011 | Lin | C07C 51/487 562/412 |
| 7,897,810 | B2 * | 3/2011 | Lin | C07C 51/487 562/412 |
| 7,959,879 | B2 * | 6/2011 | Lin | C07C 51/487 422/187 |
| 7,976,682 | B2 * | 7/2011 | Bechard | D21C 9/06 162/272 |
| 8,048,272 | B2 * | 11/2011 | Mattsson | D21C 9/02 162/380 |
| 8,211,319 | B2 * | 7/2012 | Wilsak | B01D 9/00 210/767 |
| 8,697,906 | B2 * | 4/2014 | Parker | C07C 51/47 562/474 |
| 9,018,415 | B2 * | 4/2015 | Gray et al. | |
| 9,486,722 | B2 * | 11/2016 | Keyes | B01D 33/073 |
| 10,273,198 | B2 * | 4/2019 | Zhao | C07C 63/26 |
| 10,427,073 | B2 * | 10/2019 | Bitsch-Larsen | B01D 33/067 |
| 10,577,301 | B2 * | 3/2020 | Keyes | C07C 63/26 |
| 2004/0110981 | A1 * | 6/2004 | Sheppard | C07C 51/43 562/486 |
| 2004/0245176 | A1 * | 12/2004 | Parker | C07C 51/48 210/639 |
| 2005/0051473 | A1 * | 3/2005 | Suss | B01D 33/801 210/345 |
| 2006/0091081 | A1 * | 5/2006 | Gibson | B01D 33/09 210/702 |
| 2007/0208198 | A1 * | 9/2007 | Parker | C07C 51/265 562/485 |
| 2007/0284317 | A1 * | 12/2007 | Parker | C07C 51/42 210/770 |
| 2008/0061011 | A1 * | 3/2008 | Schmid | B01D 33/04 210/769 |
| 2008/0161599 | A1 * | 7/2008 | Lin | C07C 51/487 562/485 |
| 2009/0218065 | A1 * | 9/2009 | Lundberg | D21C 9/02 162/380 |
| 2013/0245317 | A1 * | 9/2013 | Gray et al. | |
| 2013/0310602 | A1 | 11/2013 | Gnagnetti | |
| 2015/0182890 | A1 * | 7/2015 | Keyes | B01D 33/62 562/485 |
| 2018/0207558 | A1 * | 7/2018 | Bitsch-Larsen | B01D 33/067 |
| 2018/0207559 | A1 * | 7/2018 | Bartos | B01D 33/09 |
| 2018/0312460 | A1 * | 11/2018 | Keyes | C07C 63/26 |

FOREIGN PATENT DOCUMENTS

| | | |
|---|---|---|
| DE | 10005796 | 8/2001 |
| EP | 1170280 | 6/2001 |
| WO | WO-2009/081458 | 7/2009 |
| WO | WO-2013/087977 | 6/2013 |

* cited by examiner

SEPARATION PROCESS HAVING IMPROVED CAPACITY

CROSS-REFERENCE

This application claims benefit of U.S. provisional patent application Ser. No. 62/035,652 filed Aug. 11, 2014, and entitled "Separation Process Having Improved Capacity," which is hereby incorporated herein by reference in its entirety.

TECHNICAL FIELD

The present teachings relate generally to a process for separating components of a solid/liquid mixture at an improved capacity.

BACKGROUND

In many processes in the chemical, food, and pharmaceutical industries, various separation techniques are used to isolate one material from another. Common techniques for separating solid materials from a liquid include vacuum or pressure filtration, drying, centrifugation, sedimentation and clarification. When a very pure solid product is required, separation may occur in multiple stages and may be combined with washing steps. For example, a solid recovered from one of the techniques noted above may be washed or reslurried with additional liquids in order to remove impurities before be subjected to another solid-liquid separation technique to recover a final, more pure product.

Multiple-stage separation techniques may result in higher purities of solid products, but may require substantially more investment in equipment. One highly successful method to reduce capital expenditures in a multi-stage separation is through the use of a rotary pressure filter apparatus. Rotary pressure filter apparatus have been designed to perform more than one of the steps of a multiple-stage separation technique in a single piece of equipment by progressing the material being processed through separate work zones. For example, known rotary pressure filter apparatus perform a filtration in a filter or feed zone to form a filter cake, followed by a washing of the filter cake in one or more wash zones. The washed filter cake may be dried in a drying zone before leaving the rotary pressure filter. Rotary pressure filter apparatus are generally known in the art and are disclosed, for example, in U.S. Pat. Nos. 2,741,369, 7,807,060 and US Pat. App. 20050051473.

In some applications, the filter cake still remains wet even after leaving the rotary pressure filter apparatus and must be dried by another piece of equipment. Some prior art processes have sought to omit the need for and the size of downstream drying equipment by increasing the drying capability of the rotary pressure filter apparatus.

Rotary pressure filter apparatus provide also have finite throughput capacities. Some prior applications have used multiple rotary pressure filter apparatus in parallel to increase capacities, but the use of multiple apparatus lead to an increase in capital expenditures.

There remains a need to improve separation processes which utilize rotary pressure filter apparatus.

SUMMARY

According to one aspect of the present invention, a method for separating components of a solid/liquid mixture is provided. The method includes filtering a solid/liquid mixture to form a filter cake comprising the solid product on at least one filter member in a rotary pressure filter apparatus configured to apply a pressure differential across the at least one filter member; the ratio of the capacity of the rotary pressure filter apparatus to the cumulative filter area of the filter members being at least 3000 kg/(hr-m$^2$); washing the filter cake with a wash fluid in the rotary pressure filter apparatus to form a wet filter cake; transferring the wet filter cake to a dryer, the wet filter cake comprising at least 10 wt % wash fluid; and drying the wet filter cake in the dryer.

Other aspects of the present invention will be apparent in view of the description that follows.

DETAILED DESCRIPTION OF THE PREFERRED EMBODIMENTS

By way of general introduction, the present invention is directed to a process is used to recover components from a solid/liquid mixture. In some embodiments, the process is used to recover a solid product, or a liquid, or both, from a solid/liquid mixture. In some embodiments, the solid product is a pharmaceutical or a food component product. In other embodiments, the solid product is a chemical, or in particular, a petrochemical. In some embodiments, the product is an aromatic hydrocarbon such as paraxylene. In other embodiments, the product is an aromatic carboxylic acid, such as terephthalic acid.

Figure 1:
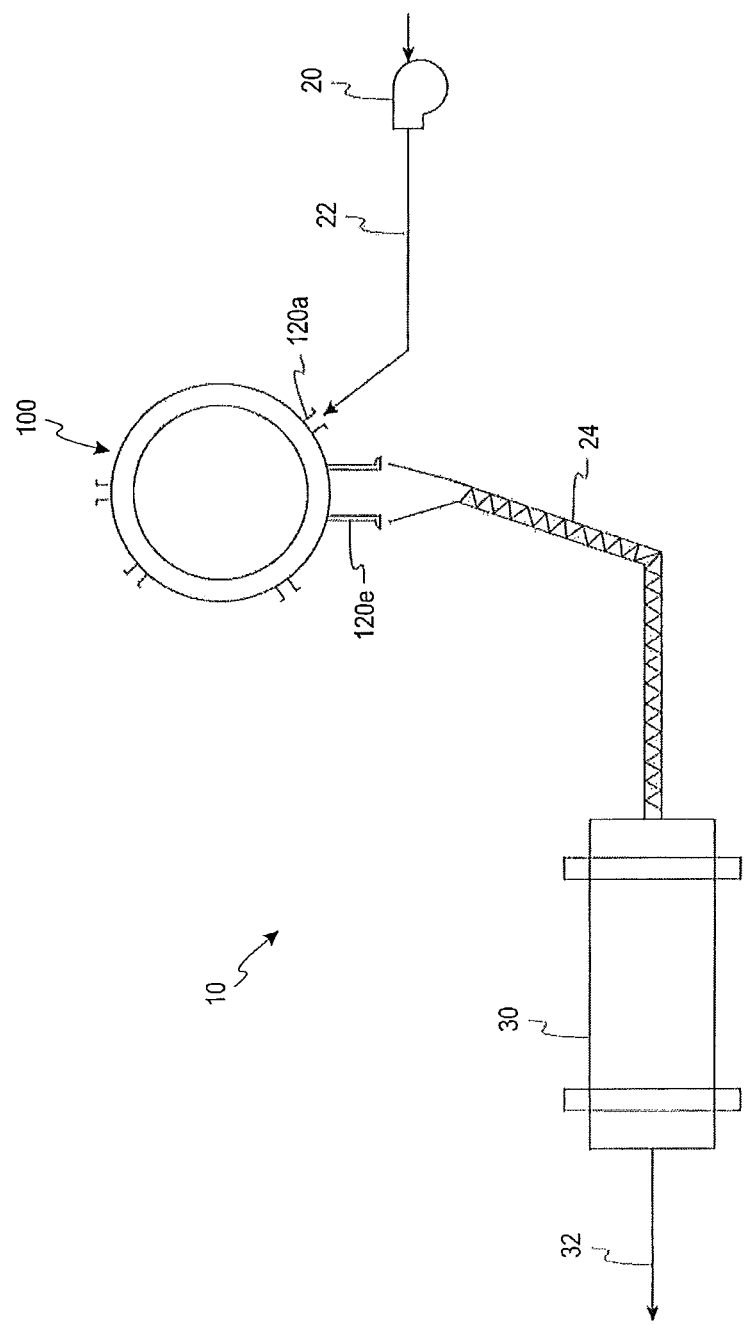
FIG. 1 shows a schematic diagram of a multi-stage separation process according to one embodiment of the present invention.

Referring now to FIG. 1, a multi-stage process for separating a solid product from a solid-liquid mixture with improved capacities in accordance with one embodiment of the invention is shown generally at 10. A solid-liquid mixture feedstock is pressurized by pump 20 and fed via line 22 into a rotary pressure filter apparatus 100 via inlet 120a. Rotary pressure filter apparatus are generally known in the art and are disclosed, for example, in U.S. Pat. Nos. 2,741,369, 7,807,060 and US Pat. App. 20050051473. The solid-liquid mixture in line 20 may comprise effluent from upstream equipment (not shown) that discharges the solid-liquid mixture, for example, from a crystallizer, a reslurrying vessel, a chemical reactor, or a mixer. The solid may be present in any concentration in the solid-liquid mixture. In one embodiment, the solid component comprises 40 to 50 wt % of the solid-liquid mixture.

As will be described in more detail below, the rotary pressure filter apparatus 100 separates a solid component from the solid/liquid mixture to form a filter cake. The filter cake exits the rotary pressure filter apparatus 100 through outlet 120e. The filter cake is transported through line 24 to dryer 30. In the embodiment shown, the line 24 is formed from one or more conveyor screws. The filter cake is dried in the dryer 30. In one embodiment, the dryer 30 is a gas fired rotary drier. The dried filter cake product then exits the dryer and is delivered downstream via line 32, either as a final product or an intermediate for further processing.

Figure 2:
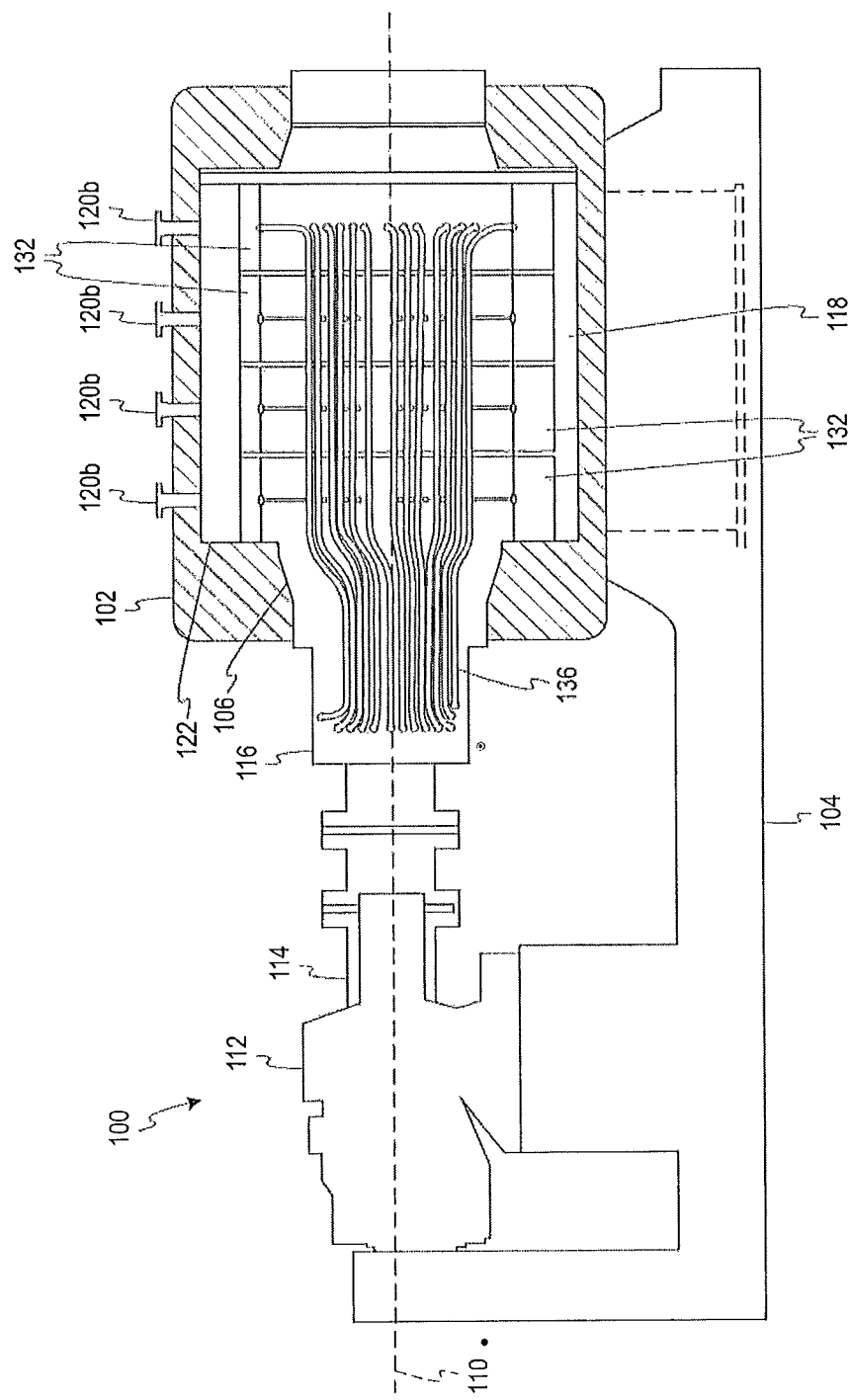
FIG. 2 shows a side view cross-section of a rotary pressure filter apparatus used in the process of FIG. 1.
Figure 3:
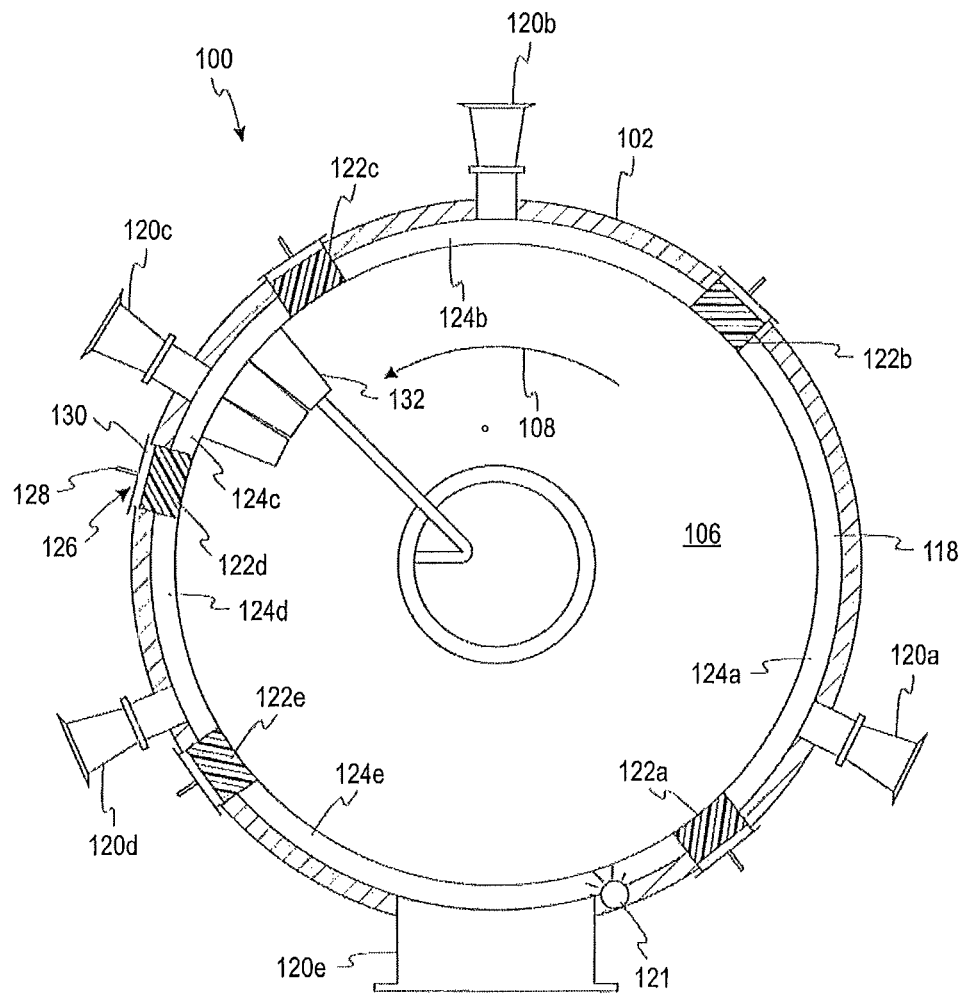
FIG. 3 shows a front view cross-section of a rotary pressure filter shown in FIG. 2.

Referring now to FIG. 2, a longitudinal cross section of rotary pressure filter apparatus in accordance with one embodiment of the invention is shown generally at 100. The rotary pressure filter apparatus 100 operates under a positive pressure to filter and remove liquid from a solid-liquid mixture and to collect a solid product as a final product or as an intermediate for further processing. The rotary pressure filter apparatus 100 includes a stationary housing 102 capable of withstanding an internal pressure above ambient. The housing 102 is mounted upon a frame 104. Inside the housing 102 is a rotary filter drum 106. As shown in FIG. 3, the rotary filter drum 106 rotates as indicated by arrow 108 around an axis 110 (FIG. 1) at speed of about 0.4 to 2 RPM, and in some embodiments at a speed of about 0.8 to 1.5 RPM. The axis 110 defines a longitudinal direction of the rotary drum 106 and the rotary pressure fitter apparatus 100. The rotary filter drum 106 is driven by a drive mechanism 112, which is also mounted on the frame 104. A shaft 114 connects the drive mechanism 112 to a control head portion 116 of the rotary drum 106.

The surface of the rotary drum 106 is spaced from the inside of the housing 102 such that a generally annular plenum 118 is formed therebetween. Material passageways 120a, 120b, 120c, 120d, and 120e, such as inlets and outlet piping, are adapted to allow passage of material between the annular plenum 118 and a location outside the housing 102.

One or more sealing members 122a, 122b, 122c, 122d, 122e are configured to contact the rotary drum 106 and divide the annular plenum 118 into a plurality of zones 124a, 124b, 124c, 124d, 124e. The sealing members 122 generally contact the rotary drum with enough pressure to pressure seal the zones 124 from each other but still allowing the rotary drum 106 to rotate. The sealing members 122 are each part of a sealing device 126 which includes an actuating mechanism adapted to members 122 in the radial direction to exert force against the rotary drum 106. In the embodiment shown, the actuating mechanism is a pneumatic device including an inlet 128 for introducing gas into a plenum 130 to exert a pressure force against the outer surface of the respective sealing member 122. Suitable pressure forces exerted by the pneumatic device include those about 0.8 to 2.0 bar above the highest pressure in any of the zones 124a-124e of the rotary pressure filter apparatus 100. Those skilled in the art will recognize that other actuating mechanisms may be substituted for the pneumatic device.

A plurality of compartments 132 are arranged around the outer surface or circumference of the rotary filter drum 106 and rotate with the filter drum 106. The compartments 132 each include a filter member 134 (shown in one compartment in FIG. 4) adjacent the filter drum. In some embodiments the filter member comprises a filter cloth supported over a metal screen in a filter housing (not shown). In some embodiments, the filter cloth is manufactured from a polyether ether ketone (PEEK) polymer or a polyvinylidene difluoride (PVDF) polymer. Each compartment 132 also has associated with it a corresponding outlet pipe 136 which also rotates with the filter drum 106 and the compartments 118. The outlet pipes 136 are configured such that filtrate received each compartment 118 passes through its corresponding filter member 134 adjacent the filter drum 106 and into its corresponding outlet pipe 136. The outlet pipes 136 remove the filtrate from the compartments 132 and deliver the filtrate to the control head 116, where it is collected through additional piping (not shown) and removed from the rotary pressure filter apparatus 100.

The compartments 132 rotate with the rotary drum 106 and accordingly pass sequentially pass through each of the zones 124a, 124b, 124c, 124d, 124e. In the embodiment shown, the compartments 132 are arranged in rows of four along the longitudinal direction 110. Those skilled in the art will recognize that other configurations of the compartments would be suitable as well.

In operation, a pressurized feed containing a solid-liquid mixture is introduced into the feed inlet material passageway 120a and into plenum 118 in a first zone designated as feed zone 124a. The solid-liquid mixture is distributed into compartments 132. In some embodiments, the pressure in the feed zone is maintained at about 3 bar(g) to about 7 bar(g), and in some embodiments, 5 bar(g) to 6 bar(g). As a result of the pressure differential that is maintained between the compartments 132 and the outlet pipes 136 and across the filter member 134 in the compartments, liquid of the solid-liquid mixture is forced through the filter member 134 into outlet pipes 136. Filtrate thus exits the rotary pressure apparatus 100 through outlet pipes 136. The solid components of the solid-liquid mixture remain on the filter members 134 in the form of a filter cake.

As the rotary drum 106 continues into the next zone 124b, designated as a wash zone, wash fluid is introduced into plenum 118 for distribution into the compartments 132 to wash the cake remaining on the filter members 134. In some embodiments, wash fluid in introduced at a rate of about 0.5 kg to about 1.5 kg of wash fluid per 1 kg of filter cake. The wash fluid is removed by outlet 136. In the embodiment shown, the rotary drum then continues to a second wash zone 124c, where additional wash fluid is introduced into zone 124c, designated as a second wash zone, and the cake on the filter members 134 is again washed.

The wash fluid is selected to remove impurities from the filter cake while not interfering with further processing of the filter cake to recover the final solid product. In one embodiment, the wash fluid comprises water. In another embodiment, the wash fluid comprises condensate from another portion of an integrated process.

The rotary drum 106 continues its rotation into drying zone 124d, where a hot inert drying gas is introduced in the plenum 118 to dry the filter cake on the filter members 134. As the rotary drum completes its rotation into discharge zone 124e, the dried filter cake falls from the compartments 132 by gravity into a material passageway 120e designated as a product chute. A rinse solution may be injected into inlet 140 in order to clean the filter members of the compartments 132 before they continue into the next cycle through the zones.

Figure 4:
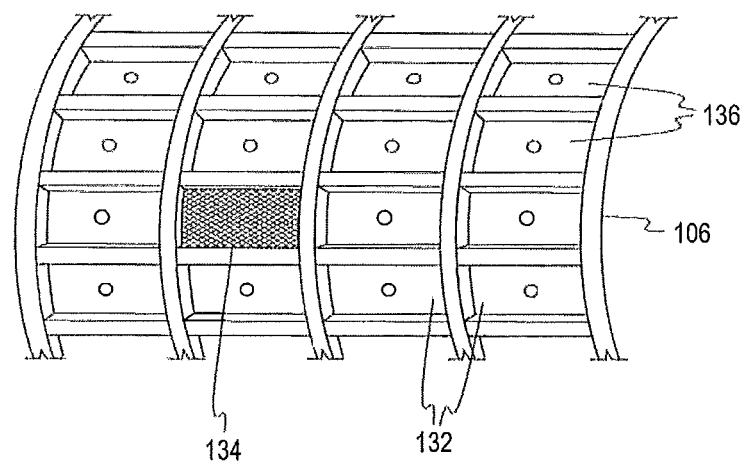
FIG. 4 shows a perspective view of a portion of a rotary drum of the rotary pressure filter apparatus shown in FIGS. 2-3.

In the embodiment shown in FIGS. 2-4, the rotary pressure filter apparatus 100 includes a single feed zone 124a, two wash zones 124b, 124c, a single dry zone 124d, and a single discharge zone 124e. In other embodiment of the inventions, the rotary pressure filter apparatus could have one wash zone, or more than two wash zones, or more than a single dry zone.

The circumference of the rotary pressure apparatus 100 defines a 360° work path, with each zone 124a, 124b, 124c, 124d, and 124e defining a portion of the work path. In accordance with the present invention, the dry zone(s) of the rotary pressure filter apparatus are generally limited in size. In one embodiment, the dry zone(s) comprises less than 50° of the work path. In another embodiment, the dry zone(s) comprises less than 40° of the work path. In another embodiment, the dry zone(s) comprises less than 30° of the work path. In another embodiment, the dry zone(s) comprises less than 20° of the work path. In one embodiment, the dry zone comprises at least 10° of the work path. In another embodiment, the dry zone comprises at least 20° of the work path.

In contrast with prior art systems, limiting the dry zone(s) size results in a wetter filter cake and therefore the need for a larger drying load in dryer 30 (FIG. 1). However, the inventors have discovered that by limiting the sizes of the dry zone(s), the capacity of the rotary pressure filter apparatus 100 can be expanded. The capacity is expanded by allowing for a larger feed zone. In accordance with one embodiment of the present invention, the feed zone comprises at least 100° of the work path. In another embodiment, the feed zone comprises at least 110° of the work path. In another embodiment, the feed zone comprises at least 120° of the work path. In another embodiment, the feed zone comprises at least 130° of the work path. In another embodiment, the feed zone comprises at least 140° of the work path. In another embodiment, the feed zone comprises at least 150° of the work path. In another embodiment, the feed zone comprises at least 160° of the work path.

In accordance with one particular embodiment of the present invention, the feed zone comprises 150° of the work path, a first wash zone comprises 65° of the work path, a second wash zone comprises 48° of the work path, a single drying zone comprises 20° of the work path, and a discharge zone comprises 77° of the work path. In accordance with another particular embodiment of the present invention, the feed zone comprises 143° of the work path, a first wash zone comprises 64° of the work path, a second wash zone comprises 49° of the work path, a single drying zone comprises 27° of the work path, and a discharge zone comprises 77° of the work path. In accordance with another particular embodiment of the present invention, the feed zone comprises 135° of the work path, a first wash zone comprises 62° of the work path, a second wash zone comprises 48° of the work path, a single drying zone comprises 35° of the work path, and a discharge zone comprises 80° of the work path.

The improved capacities of the rotary pressure filter apparatus according to the present invention may be expressed as ratio of the throughput to the cumulative filter area of all the filter members 134. In one embodiment, the ratio of the capacity of the rotary pressure filter apparatus to the cumulative area of all the filter members is at least 3000 kg dry cake/(hr-m$^2$). In another embodiment, the ratio of the capacity of the rotary pressure filter apparatus to the cumulative area of all the filter members is at least 4000 kg dry cake/(hr-m$^2$). In another embodiment, the ratio of the capacity of the rotary pressure filter apparatus to the cumulative area of all the filter members is at least 5000 kg dry cake/(hr-m$^2$). In another embodiment, the ratio of the capacity of the rotary pressure filter apparatus to the cumulative area of all the filter members is at least 7000 kg dry cake/(hr-m$^2$). In another embodiment, the ratio of the capacity of the rotary pressure filter apparatus to the cumulative area of all the filter members is at least 8000 kg dry cake/(hr-m$^2$). In another embodiment, the ratio of the capacity of the rotary pressure filter apparatus to the cumulative area of all the filter members is at least 10000 kg dry cake/(hr-m$^2$).

Because of the reduced drying zones, the filter cake exiting the rotary pressure filter apparatus 100 of the present contain more wash fluid. In one embodiment, the filter cake contains at least 10 wt % wash fluid. In another embodiment, the filter cake contains at least 12 wt % wash fluid. In another embodiment, the filter cake contains at least 14 wt % wash fluid. In another embodiment, the filter cake contains at least 15 wt % wash fluid. In another embodiment, the filter cake contains at least 18 wt % wash fluid. In another embodiment, the filter cake contains at least 20 wt % wash fluid. In another embodiment, the filter cake contains at least 10 wt % but less than 25 wt % wash fluid.

The increased wetness of the filter cake requires that the dryer have a larger heating load capacity for any given wash fluid. In one embodiment of the present invention, the wash fluid is water and the dryer operates at a heating load of at least 50 kcal/kg wet cake fed to the dryer. In another embodiment of the invention, the dryer operates at a heating load of at least 60 kcal/kg wet cake. In another embodiment of the invention, the dryer operates at a heating load of at least 70 kcal/kg wet cake. In another embodiment of the invention, the dryer operates at a heating load of at least 80 kcal/kg wet cake.

The process of the present invention is applicable to a variety of separation processes. In some embodiments, process is used to recover a solid product as a filter cake, or a liquid, or both, from a solid/liquid mixture. In one embodiment, the resulting filter cake includes a petrochemical, such as an aromatic carboxylic acid. In another embodiment, the solid is terephthalic acid. In one particular embodiment, the filter cake comprises a crude terephthalic acid being at least 99.0 wt % terephthalic acid on a solvent free basis, or at least 99.4 wt % terephthalic acid on a solvent free basis, or at least 99.45 wt % terephthalic acid on a solvent free basis, or at least least 99.5 wt % terephthalic acid on a solvent free basis. In another particular embodiment, the filter cake comprises a purified crude terephthalic acid being at least 99.7 wt % terephthalic acid on a solvent free basis, or at least 99.8 wt % terephthalic acid on a solvent free basis, at least least 99.85 wt % terephthalic acid on a solvent free basis, or at least 99.9 wt % terephthalic acid on a solvent free basis.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

What is claimed is:

1. A method for separating a solid/liquid mixture, comprising:
   in a rotary pressure filter apparatus comprising one or more filter members, the rotary pressure filter having a cumulative filter area of all filter members thereof, filtering a solid/liquid mixture to form a filter cake comprising the solid on at least one filter member at a rate sufficient to form at least 3000 kg of filter cake per square meter of cumulative filter area per hour, calculated on a dry-weight basis;
   washing the filter cake with a wash fluid in the rotary pressure filter apparatus to form a wet filter cake;
   transferring the wet filter cake to a dryer, the wet filter cake comprising at least 10 wt % wash fluid; and
   drying the wet filter cake in the dryer.

2. The method of claim 1, wherein the solid/liquid mixture is filtered at a rate sufficient to form at least 5000 kg of filter cake per square meter of cumulative filter area per hour, calculated on a dry-weight basis.

3. The method of claim 1, wherein the solid/liquid mixture is filtered at a rate sufficient to form at least 8000 kg of filter cake per square meter of cumulative filter area per hour, calculated on a dry-weight basis.

4. The method of claim 3, wherein the wet filter cake comprises at least 12 wt % wash fluid.

5. The method of claim 3, wherein the wet filter cake comprises at least 15 wt % wash fluid.

6. The method of claim 1, wherein a circumference of the rotary pressure apparatus defines a 360° work path, and the at least one dry zone comprises less than 50° of the work path.

7. The method of claim 1, wherein a circumference of the rotary pressure apparatus defines a 360° work path, and the at least one dry zone comprises less than 40° of the work path.

8. The method of claim 1, wherein a circumference of the rotary pressure apparatus defines a 360° work path, and the at least one dry zone comprises less than 30° of the work path.

9. The method of claim 1, wherein the filter cake comprises an aromatic carboxylic acid.

10. The method of claim 1, wherein the filter cake comprises terephthalic acid.

11. The method of claim 10, wherein the filter cake comprises at least 99.4 wt % terephthalic acid on a solvent free basis.

12. The method claim 10, wherein the filter cake comprises at least 99.8 wt % terephthalic acid on a solvent free basis.

13. The method of claim 10, wherein the wash fluid comprises water.

14. The method of claim 1, wherein a circumference of the rotary pressure apparatus defines a 360° work path, and the work path comprises a feed zone, a first wash zone, a second wash zone, a dry zone, and a discharge zone.

15. The method of claim 14, wherein
the feed zone comprises at least 100° of the work path; and
the dry zone comprises less than 50° of the work path.

16. The method of claim 14, wherein
the feed zone comprises at least 120° of the work path; and
the dry zone comprises less than 40° of the work path.

17. The method of claim 1, wherein
the solid/liquid mixture is filtered at a rate sufficient to form at least 5000 kg of filter cake per square meter of cumulative filter area per hour, calculated on a dry-weight basis; and
the wet filter cake comprises at least 12 wt % wash fluid.

18. The method of claim 1, wherein
the solid/liquid mixture is filtered at a rate sufficient to form at least 8000 kg of filter cake per square meter of cumulative filter area per hour, calculated on a dry-weight basis; and
the wet filter cake comprises at least 15 wt % wash fluid.

19. The method of claim 1, wherein
the solid/liquid mixture is filtered at a rate sufficient to form at least 5000 kg of filter cake per square meter of cumulative filter area per hour, calculated on a dry-weight basis;
the wet filter cake comprises at least 12 wt % wash fluid; and
a circumference of the rotary pressure apparatus defines a 360° work path, and the at least one dry zone comprises less than 50° of the work path.

20. The method of claim 1, wherein
the solid/liquid mixture is filtered at a rate sufficient to form at least 8000 kg of filter cake per square meter of cumulative filter area per hour, calculated on a dry-weight basis; and
the wet filter cake comprises at least 15 wt % wash fluid; and
a circumference of the rotary pressure apparatus defines a 360° work path, and the at least one dry zone comprises less than 40° of the work path.

\* \* \* \* \*